US012633445B2

(12) United States Patent
Shigematsu et al.

(10) Patent No.: US 12,633,445 B2
(45) Date of Patent: May 19, 2026

(54) ELECTRONIC COMPONENT

(71) Applicant: Murata Manufacturing Co., Ltd., Nagaokakyo (JP)

(72) Inventors: Satoshi Shigematsu, Nagaokakyo (JP); Kenichi Ishizuka, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 208 days.

(21) Appl. No.: 18/743,164

(22) Filed: Jun. 14, 2024

(65) Prior Publication Data

US 2024/0331922 A1 Oct. 3, 2024

Related U.S. Application Data

(63) Continuation of application No. PCT/JP2023/002068, filed on Jan. 24, 2023.

(30) Foreign Application Priority Data

Feb. 17, 2022 (JP) ................................ 2022-022961

(51) Int. Cl.

*H01H 9/00* (2006.01)
*H01F 27/28* (2006.01)
*H01F 27/29* (2006.01)
*H01F 27/40* (2006.01)

(52) U.S. Cl.

CPC ....... *H01F 27/2804* (2013.01); *H01F 27/292* (2013.01); *H01F 27/40* (2013.01); *H01F 2027/2809* (2013.01)

(58) Field of Classification Search

CPC .................................................. H01F 27/2804
See application file for complete search history.

(56) References Cited

U.S. PATENT DOCUMENTS 6,238,779 B1 5/2001 Iwao et al.
2006/0022770 A1* 2/2006 Asakawa ............ H01F 17/0013 333/175
2011/0128109 A1* 6/2011 Tada ......................... H01F 3/14 336/200

(Continued)

FOREIGN PATENT DOCUMENTS

JP H11329844 A 11/1999
JP 2000195720 A 7/2000

(Continued)

OTHER PUBLICATIONS

International Search Report in PCT/JP2023/002068, mailed Apr. 25, 2023, 3 pages.

(Continued)

*Primary Examiner* — Stephen W Jackson
(74) *Attorney, Agent, or Firm* — Keating & Bennett, LLP

(57) ABSTRACT

An electronic component includes a body including insulating layers laminated in a Z-axis direction, and a primary coil and a secondary coil inside the body. The secondary coil includes wiring patterns separated by intervals in the Z-axis direction. The primary coil includes wiring patterns separated by intervals in the Z-axis direction, and a gap in a region sandwiched by adjacent wiring patterns. A dimension of the gap is larger than a distance between the adjacent wiring patterns that do not include the gap.

19 Claims, 9 Drawing Sheets

MODEL 1

(56) References Cited

U.S. PATENT DOCUMENTS

| | | | | |
|---|---|---|---|---|
| 2012/0212919 | A1* | 8/2012 | Mano | H05K 3/4602 174/258 |
| 2018/0090255 | A1* | 3/2018 | Noguchi | H01F 27/292 |
| 2018/0151951 | A1* | 5/2018 | Ikemoto | H05K 1/181 |
| 2018/0254139 | A1 | 9/2018 | Yazaki | |
| 2019/0051440 | A1 | 2/2019 | Ueki | |
| 2021/0320638 | A1* | 10/2021 | Shigematsu | H01F 27/40 |
| 2022/0301759 | A1* | 9/2022 | Yoshioka | H01F 27/2804 |

FOREIGN PATENT DOCUMENTS

| | | | |
|---|---|---|---|
| JP | 2001307933 | A | 11/2001 |
| WO | 2017110952 | A1 | 6/2017 |
| WO | 2018012400 | A1 | 1/2018 |
| WO | 2021044848 | A1 | 3/2021 |

OTHER PUBLICATIONS

Written Opinion in PCT/JP2023/002068, mailed Apr. 25, 2023, 5 pages.

* cited by examiner

| | L1 [nH] | L2 [nH] | COUPLING COEFFICIENT k | CHANGE RATE | | |
|---|---|---|---|---|---|---|
| | | | | L1 | L2 | k |
| MODEL 1 | 4.16 | 6.15 | 0.500 | REFERENCE | | |
| MODEL 2 | 4.02 | 6.11 | 0.550 | −3.60% | −0.70% | 9.10% |
| MODEL 3 | 4.08 | 6.08 | 0.580 | −2.00% | −1.20% | 14.10% |
| COMPARATIVE EXAMPLE 1 | 4.39 | 6.05 | 0.585 | | | |
| COMPARATIVE EXAMPLE 2 | 4.37 | 6.19 | 0.460 | | | |

ELECTRONIC COMPONENT

CROSS REFERENCE TO RELATED APPLICATIONS

This application claims the benefit of priority to Japanese Patent Application No. 2022-022961 filed Feb. 17, 2022 and is a Continuation application of PCT Application No. PCT/JP2023/002068 filed on Jan. 24, 2023. The entire contents of each application are hereby incorporated herein by reference.

BACKGROUND OF THE INVENTION

1. Field of the Invention

The present disclosure relates to electronic components each including first and second coils inside of an insulating body and separated by an interval, and magnetically coupled to each other.

2. Description of the Related Art

Japanese Unexamined Patent Application Publication No. 2001-307933 discloses a transformer including a primary coil and a secondary coil that are laminated and magnetically coupled to each other in a body having an insulating property. In this transformer, a prepreg (a sheet-shaped fiber impregnated with a resin) is located between the primary coil and the secondary coil. A coupling coefficient between the primary coil and the secondary coil can be adjusted by adjusting the number of sheets constituting the prepreg.

SUMMARY OF THE INVENTION

In the configuration of the transformer disclosed in Japanese Unexamined Patent Application Publication No. 2001-307933, a distance between the primary coil and the secondary coil can be changed only by the number of sheets constituting the prepreg, and there is a problem in which the coupling coefficient cannot be finely adjusted.

Example embodiments of the present invention provide electronic components each including first and second coils inside of a body, in which a coupling coefficient between the first coil and the second coil can be finely adjusted while preventing an increase in height of the body.

According to an example embodiment of the present disclosure, an electronic component includes a body with an insulating property and a plurality of insulating layers, and a first coil and a second coil inside of the body and separated by an interval between the first coil and the second coil in a lamination direction in which the insulating layers are laminated, and connected in series to each other. The first coil includes a plurality of first wiring patterns separated by intervals in the lamination direction. The second coil includes a plurality of second wiring patterns separated by intervals in the lamination direction, and a gap in at least one region of a plurality of regions which are sandwiched between the second wiring patterns adjacent to each other in the lamination direction among the plurality of second wiring patterns. A dimension of the gap is larger than a distance between the second wiring patterns adjacent to each other in the lamination direction without the gap and is different from a distance between the first wiring patterns adjacent to each other.

According to an example embodiment of the present disclosure, the first coil and the second coil that are connected in series to each other are positioned side by side inside of the body with the interval in the lamination direction. The gap is in the second coil but not between the first coil and the second coil. Therefore, a coupling coefficient between the first coil and the second coil can be finely adjusted, as compared with a case where the gap is between the first coil and the second coil. Further, since the gap is not in the first coil, an increase in height (dimension in the lamination direction) of the body is prevented. As a result, the coupling coefficient can be finely adjusted while preventing the increase in height of the body.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
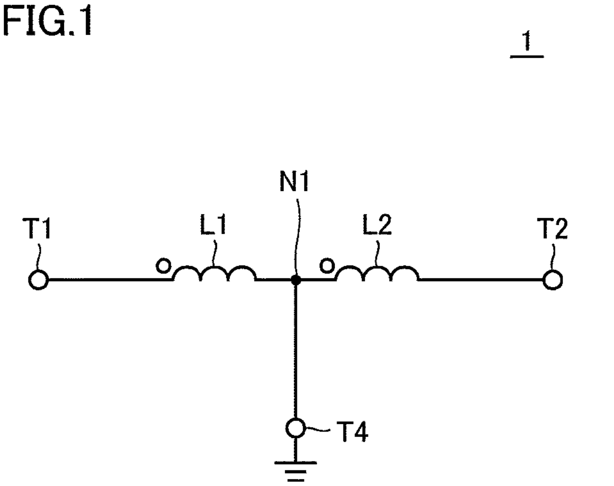
FIG. 1 is a circuit diagram (part 1) of an electronic component.

Hereinafter, example embodiments of the present disclosure will be described in detail with reference to the accompanying drawings. The same or corresponding elements, features, and characteristics in the drawings are denoted by the same reference numerals, and the description is not repeated.

Example Embodiment 1

FIG. 1 is a circuit diagram of an electronic component 1 according to Example Embodiment 1. The electronic component 1 is, for example, a transformer used for communication in a high frequency band of, for example, several hundred MHz or more.

The electronic component 1 includes external terminals T1, T2, and T4, and a primary coil L1 and a secondary coil L2 that are connected in series between the external terminal T1 and the external terminal T2. The primary coil L1 and the secondary coil L2 are magnetically coupled to each other. In the present example embodiment, the primary coil L1 and the secondary coil L2 are connected to each other in a movable manner. The primary coil L1 and the secondary coil L2 may be differentially connected to each other. A state in which inductors are connected to each other in a movable manner is a connection state in which a magnetic field generated by the two inductors is enhanced in the same direction in a case where a current flows from one inductor to the other inductor in a direction of the other inductor with a connection point interposed therebetween, and is a connection state in which a magnetic flux intersecting a wiring pattern of the inductor is shared. For example, in a case where coil openings of the two inductors have a coil shape overlapping with each other in a plan view, a winding direction from an end portion different from a connection point of one inductor to the connection point, and a winding direction from a connection point of the other inductor to an end portion different from the connection point, are the same.

A connection point N1 between the primary coil L1 and the secondary coil L2 is connected to the external terminal T4. In the present example embodiment, the external terminal T4 is grounded. Therefore, the connection point N1 is grounded with the external terminal T4 interposed therebetween.

Figure 2:
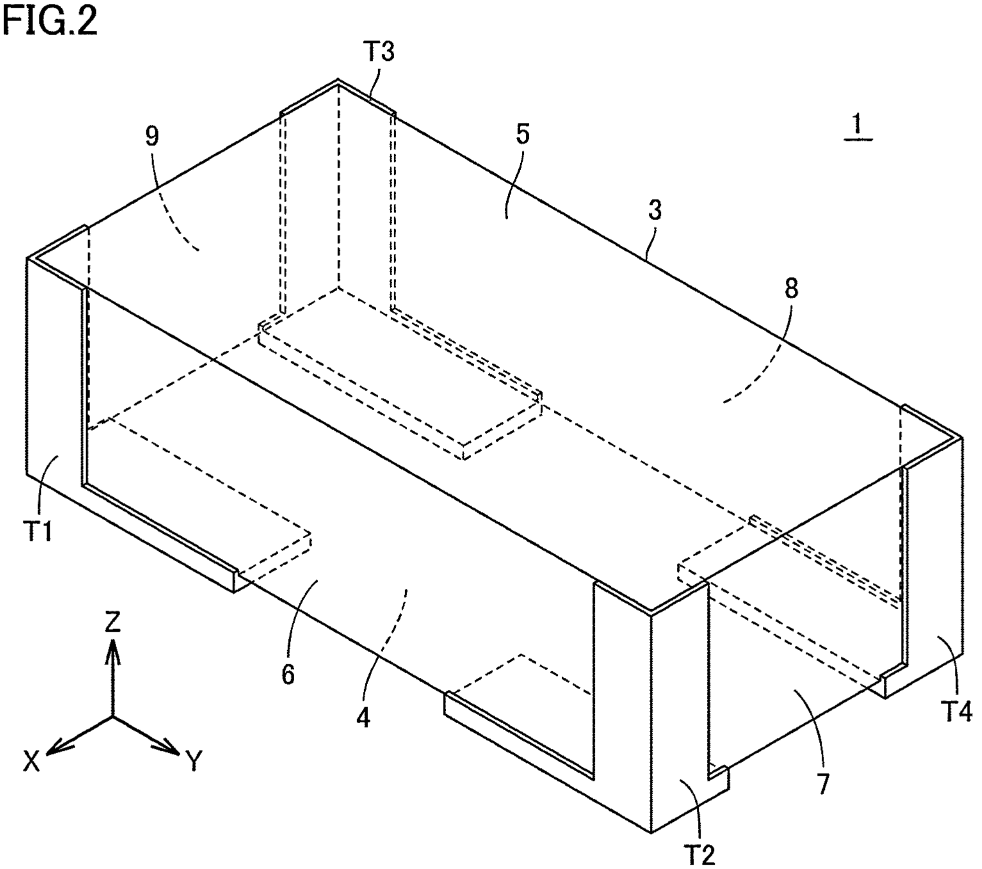
FIG. 2 is an external perspective view of the electronic component.

FIG. 2 is an external perspective view of the electronic component 1. The electronic component 1 includes a body 3 with an insulating property. The body 3 is formed by laminating a plurality of insulating layers on a surface in a lamination direction in which a wiring pattern is formed. The insulating layer includes, for example, a low temperature co-fired ceramic (LTCC) material including borosilicate glass as a main component, a material such as an insulating resin of polyimide resin or a glass epoxy resin. In addition, by a treatment such as firing or solidification, in some cases, an interface between the plurality of insulating layers is not clear.

The body 3 has a rectangular or substantially rectangular parallelepiped shape. Specifically, the body 3 includes a rectangular or substantially rectangular bottom surface 4 and a top surface 5 that face each other, and four side surfaces 6 to 9 that connect the bottom surface 4 and the top surface 5.

Hereinafter, a lamination direction of the insulating layer in the body 3 is also referred to as a "Z-axis direction", a direction along a short side of the bottom surface 4 is also referred to as an "X-axis direction", and a direction along a long side of the bottom surface 4 is also referred to as a "Y-axis direction". In addition, in the following description, a positive direction (a direction from the bottom surface 4 to the top surface 5) of the Z-axis in each drawing may be referred to as an upper side, and a negative direction may be referred to as a lower side.

The four external terminals T1 to T4 are respectively located at four corners of the bottom surface 4 of the body 3 in a case where the body 3 is viewed in a plan view in the Z-axis direction. As illustrated in FIG. 2, each of the external terminals T1 to T4 extends along a bottom surface and two side surfaces in contact with a corner on which each of the external terminals T1 to T4 is located. In this manner, by disposing the external terminals T1 to T4 on an outside (bottom surface and side surface) instead of an inside of the body 3, the body 3 can be downsized, and a mounting strength of the electronic component 1 can be improved.

Figure 3:
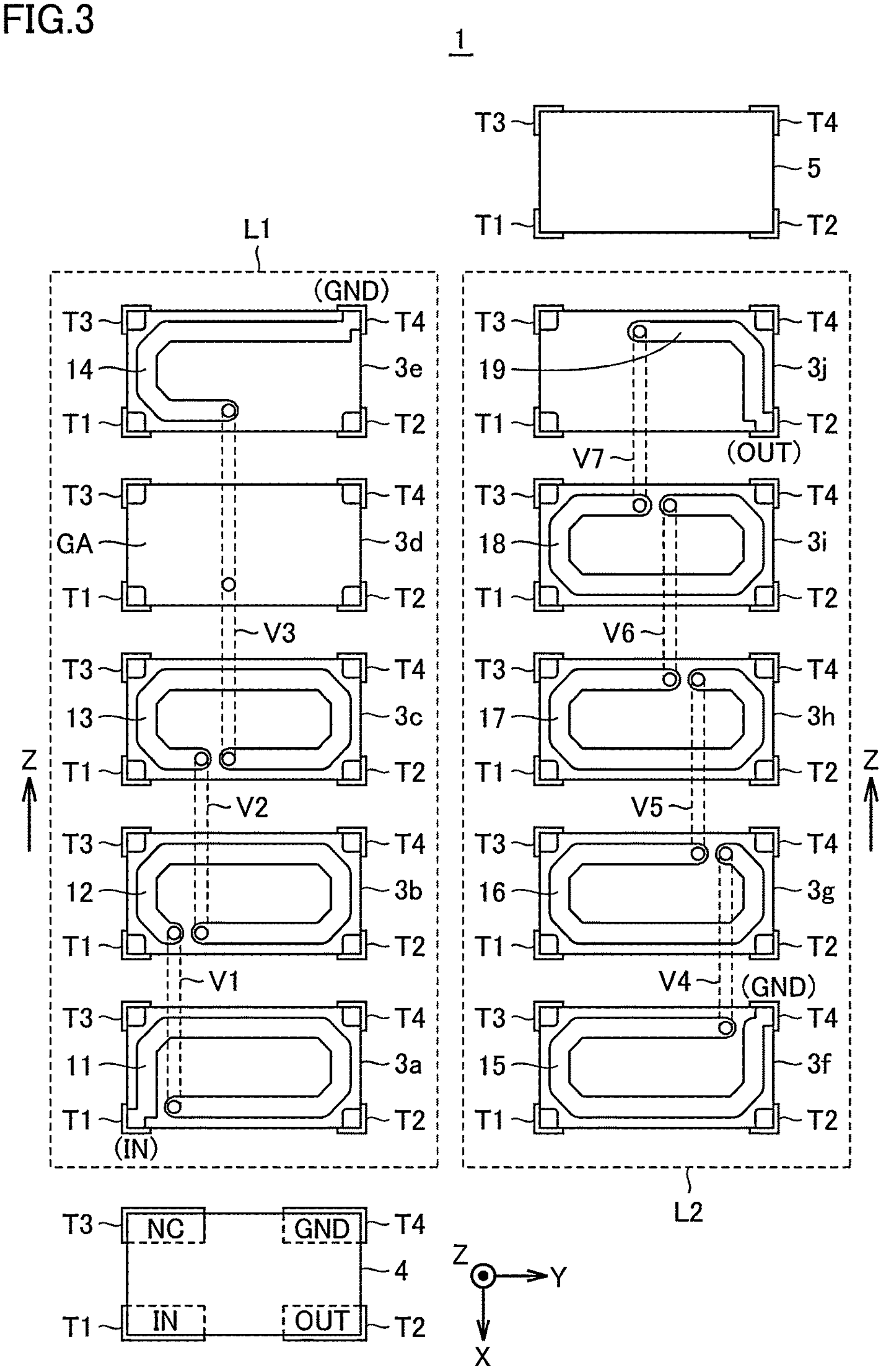
FIG. 3 is an exploded plan view (part 1) illustrating an internal configuration of the electronic component.

FIG. 3 is an exploded plan view illustrating an internal configuration of the electronic component 1. The body 3 of the electronic component 1 is formed by laminating 10 layers (10 sheets) of insulating layers 3*a* to 3*j* in this order in the Z-axis direction between the bottom surface 4 and the top surface 5. A thickness of each layer (dimension in the Z-axis direction obtained by adding a thickness of one insulating layer and a thickness of a wiring pattern formed at the insulating layer) is the same or substantially the same for all the layers.

Four electrodes connected to the external terminals T1 to T4 are located at each of four corners of the insulating layers 3*a* to 3*j*. In the electronic component 1 according to the present example embodiment, the external terminal T1 is an input terminal (IN) to which a signal from the outside is input, the external terminal T2 is an output terminal (OUT) from which a signal from the electronic component 1 is output to the outside, the external terminal T3 is a non-connect terminal (NC) that is not connected to an internal circuit of the electronic component 1, and the external terminal T4 is a ground terminal (GND) that is connected to an outside ground.

The primary coil L1 is formed by laminating the five insulating layers 3*a* to 3*e*. Each of four wiring patterns 11 to 14 is provided at an upper surface of each of the insulating layers 3*a*, 3*b*, 3*c*, and 3*e*. A wiring pattern is not provided at the insulating layer 3*d*. One end portion of the wiring pattern 11 on the insulating layer 3*a* is connected to the external terminal T1 which is an input terminal. The other end portion of the wiring pattern 11 is connected to one end portion of the wiring pattern 12, which is a one-upper layer, with a via V1 interposed therebetween, which penetrates the insulating layer 3*b*. The other end portion of the wiring pattern 12 is connected to one end portion of the wiring pattern 13, which is a one-upper layer, with a via V2 interposed therebetween. The other end portion of the wiring pattern 13 is connected to one end portion of the wiring pattern 14, which is a two-upper layer, with a via V3 interposed therebetween, which penetrates the insulating layer 3*d* and the insulating layer 3*e*. The other end portion of the wiring pattern 14 is connected to the external terminal T4 which is a ground terminal.

The secondary coil L2 is formed by laminating the five insulating layers 3*f* to 3*j*. Each of five wiring patterns 15 to 19 is provided at an upper surface of each of the insulating layers 3*f* to 3*j*. One end portion of the wiring pattern 15 on the insulating layer 3*f* is connected to the external terminal T4 which is a ground terminal. The other end portion of the wiring pattern 15 is connected to one end portion of the wiring pattern 16, which is a one-upper layer, with a via V4 interposed therebetween, which is formed to penetrate the insulating layer 3*g*. The other end portion of the wiring pattern 16 is connected to one end portion of the wiring pattern 17, which is a one-upper layer, with a via V5 interposed therebetween. The other end portion of the wiring pattern 17 is connected to one end portion of the wiring pattern 18, which is a one-upper layer, with a via V6 interposed therebetween. The other end portion of the wiring pattern 18 is connected to one end portion of the wiring pattern 19, which is a one-upper layer, with a via V7 interposed therebetween. The other end portion of the wiring pattern 19 is connected to the external terminal T2, which is an output terminal.

As illustrated in FIG. 3, each of the wiring patterns 11 to 19 preferably has a loop shape of less than one lap on an insulating layer on which each of the wiring patterns 11 to 19 is located. The four wiring patterns 11 to 14 each having a loop shape of less than one lap are connected by the vias V1 to V3 to form the primary coil L1 in a spiral (helical) shape. The five wiring patterns 15 to 19 each having a loop shape of less than one lap are connected by the vias V4 to V7 to form the secondary coils L2 in a spiral (helical) shape.

A winding axis of the primary coil L1 is included in an opening of the secondary coil L2 when viewed from the Z-axis direction. In addition, a winding axis of the secondary coil L2 is included in an opening of the primary coil L1 when viewed from the Z-axis direction. The "winding axis" of each coil is an axis passing through a center of a formation region of each coil in a case where each coil is viewed in a plan view from the Z-axis direction, and is an axis passing through a strongest portion of a magnetic field generated in each coil. The "opening" of each coil is an inner portion surrounded by a wiring pattern of each coil in a case where each coil is viewed in a plan view from the lamination direction.

In this manner, by positioning the winding axes of both the primary coil L1 and the secondary coil L2 such that both the winding axes are included in both the openings, the opening of the primary coil L1 and the opening of the secondary coil L2 largely overlap with each other when viewed from the Z-axis direction, so that the magnetic coupling between the primary coil L1 and the secondary coil L2 can be strengthened.

In addition, in the present example embodiment, as described above, the shape of each of the wiring patterns 11 to 19 of the primary coil L1 and the secondary coil L2 is a loop shape of less than one lap. Therefore, the opening of each coil can be formed wider than in a case where the shape of each of the wiring patterns 11 to 19 has a loop shape (spiral shape or helical shape) of one or more laps, and a disturbance of the magnetic field generated in each coil can be reduced. Therefore, the magnetic coupling between the primary coil L1 and the secondary coil L2 can be further strengthened.

Each of the insulating layers 3*a* to 3*j* is formed of, for example, a ceramic green sheet. Each of the wiring patterns 11 to 19 can be formed by pattern-printing with a conductive paste on a ceramic green sheet on which each of the wiring patterns 11 to 19 is located.

In the electronic component 1 according to the present example embodiment, the insulating layer 3*d* in which no wiring pattern is formed is interposed in a region (fourth layer from the bottom surface 4) between the insulating layer 3*c* and the insulating layer 3*e*, among the five layers in which the primary coil L1 is located. Therefore, the insulating layer 3*d* functions as a "gap GA" located in the primary coil L1.

Figure 4:
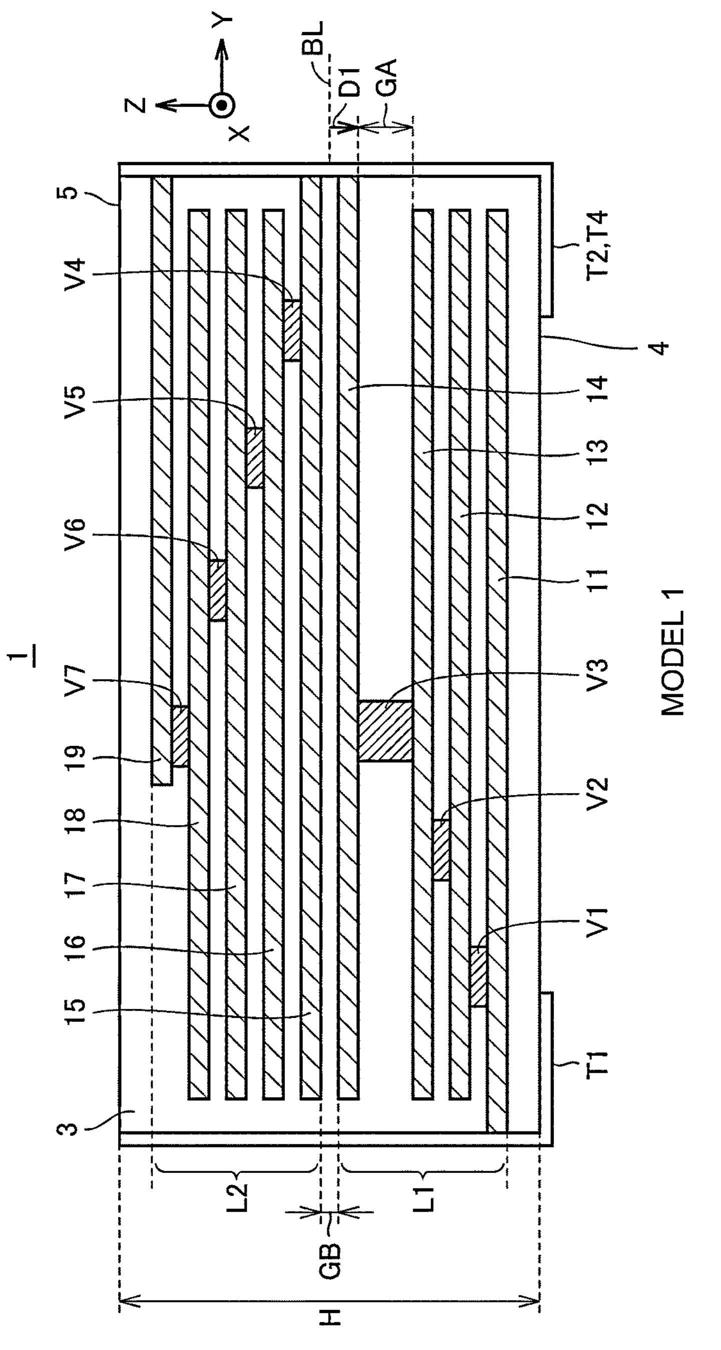
FIG. 4 is a cross-sectional diagram (part 1) of the electronic component.

FIG. 4 is a cross-sectional diagram of the electronic component 1. The electronic component 1 is formed by laminating the 10 layers (10 sheets) of insulating layers 3*a* to 3*j* described above (10 sheets) in the Z-axis direction, and the primary coil L1 and the secondary coil L2, which are magnetically coupled to each other, are formed in the inside of the body 3. A height (dimension in the Z-axis direction) of the electronic component 1 is a predetermined value H corresponding to a thickness of 10 layers.

The primary coil L1 is formed by connecting the wiring patterns 11 to 14 of four layers, which are separated by intervals in the Z-axis direction, to each other through the vias V1 to V3. The secondary coil L2 is formed by connecting the wiring patterns 15 to 19 of five layers, which are separated by intervals in the Z-axis direction, to each other through the vias V4 to V7.

The gap GA is formed by interposing the insulating layer 3*d* in which no wiring pattern is formed in a region (fourth layer from the bottom surface 4) between the insulating layer 3*c* in which the wiring pattern 13 is formed at the upper surface and the insulating layer 3*e* in which the wiring pattern 14 is formed at the upper surface, among the five layers in which the primary coil L1 is located. Therefore, a dimension of the gap GA (dimension in the Z-axis direction) is a thickness of the insulating layer 3*d* and the insulating layer 3*e* (thickness of two insulating layer sheets) interposed between the wiring pattern 13 and the wiring pattern 14. On the other hand, distances between the adjacent wiring patterns in the Z-axis direction in the body 3 without the gap GA are all the thickness of one insulating layer sheet.

Therefore, the dimension of the gaps GA is larger than the distance between the adjacent wiring patterns in the Z-axis direction in the primary coil L1 without the gaps GA. That is, the dimension of the gap GA is larger than a distance between the wiring patterns 11 and 12 and a distance between the wiring patterns 12 and 13.

Further, the dimension of the gaps GA is different from the distance in the Z-axis direction between the wiring patterns in the secondary coil L2. Specifically, the dimension of the gap GA is larger than a distance between the wiring patterns 15 and 16, a distance between the wiring patterns 16 and 17, a distance between the wiring patterns 17 and 18, and a distance between the wiring patterns 18 and 19.

Further, the dimension of the gap GA is larger than a distance in the Z-axis direction between the primary coil L1 and the secondary coil L2 (a distance between the wiring pattern 14 of the primary coil L1 and the wiring pattern 15 of the secondary coil L2 which are adjacent to each other, hereinafter, also referred to as "inter-coil distance GB").

In the electronic component 1, as illustrated in FIG. 4, the gap GA is located in a region closest to the secondary coil L2 among three regions of the primary coil L1, which are sandwiched by the adjacent wiring patterns, that is, in a region between the wiring patterns 13 and 14, while maintaining a height of the body 3 at a predetermined value H. Therefore, when a center of the inter-coil distance GB in the Z-axis direction is a boundary BL, a distance from the boundary BL to the gap GA is a predetermined value D1 corresponding to substantially one layer as illustrated in FIG. 4.

The region in which the gap GA is located is not necessarily limited to the region closest to the secondary coil L2.

Figure 5:
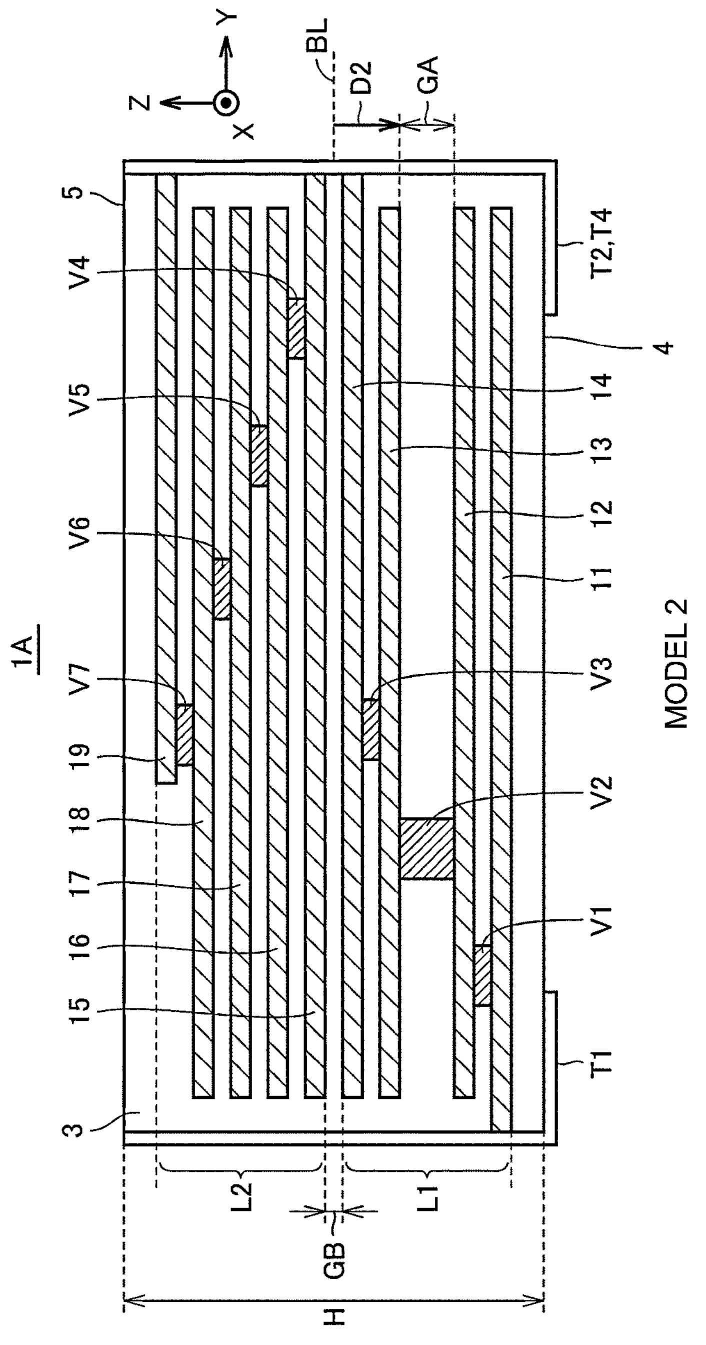
FIG. 5 is a cross-sectional diagram (part 2) of the electronic component.

FIG. 5 is a cross-sectional diagram of another electronic component 1A according to the present example embodiment. In the electronic component 1A, the gap GA is located in an intermediate region in the primary coil L1, that is, in a region between the wiring patterns 12 and 13. Therefore, a distance from the boundary BL to the gap GA is a predetermined value D2 larger than the predetermined value D1.

Figure 6:
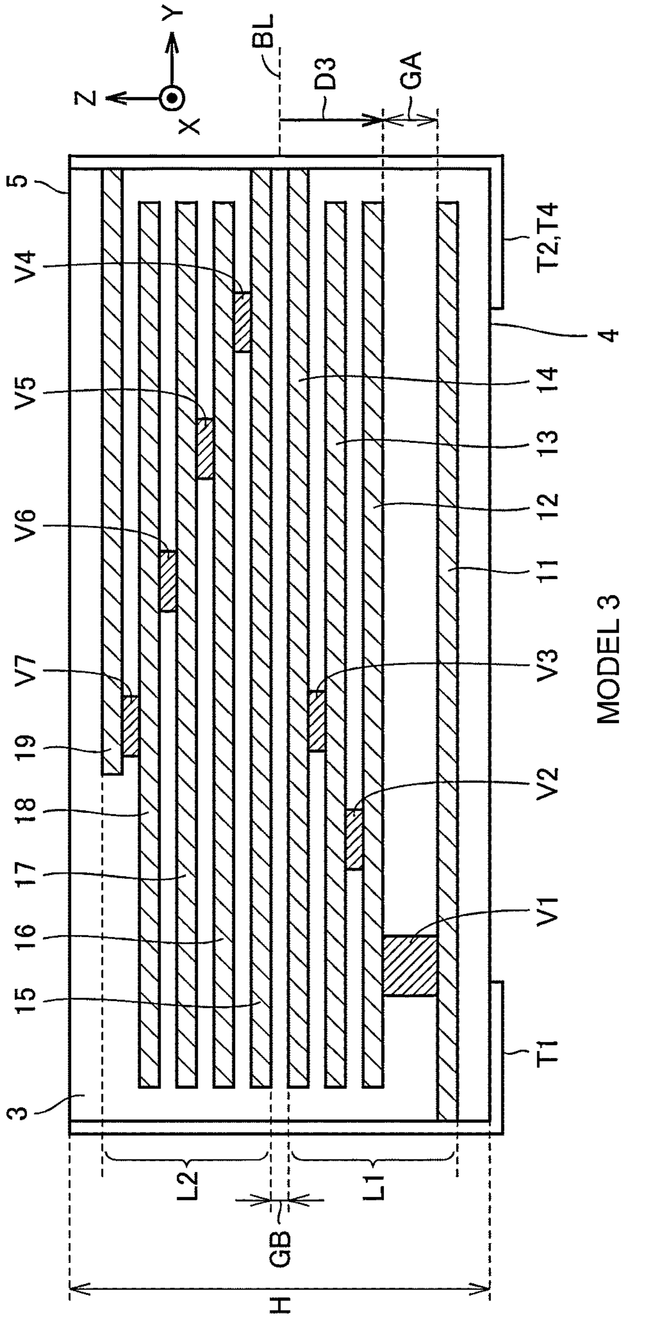
FIG. 6 is a cross-sectional diagram (part 3) of the electronic component.

FIG. 6 is a cross-sectional diagram of still another electronic component 1B according to the present example embodiment. In the electronic component 1B, the gap GA is located in a region farthest from the secondary coil L2 in the primary coil L1, that is, in a region between the wiring patterns 11 and 12. Therefore, a distance from the boundary BL to the gap GA is a predetermined value D3 larger than the predetermined value D2.

In any of the electronic components 1, 1A, and 1B, the gap GA corresponding to an interval of two insulating layer sheets is provided in the primary coil L1, instead of between the primary coil L1 and the secondary coil L2. In the electronic components 1, 1A, and 1B, the positions of the gaps GA (distances from the boundary BL to the gap GA) are different. Therefore, in any of the electronic components 1, 1A, and 1B, a coupling coefficient k between the primary coil L1 and the secondary coil L2 can be finely and gradually adjusted while maintaining the height of the body 3 at the predetermined value H.

The present inventors performed a simulation of calculating an inductance value of the primary coil L1, an inductance value of the secondary coil L2, and the coupling coefficient k between the primary coil L1 and the secondary coil L2 for each of Model 1, Model 2, and Model 3, in which the electronic component 1 illustrated in FIG. 4 is referred to as "Model 1", the electronic component 1A illustrated in FIG. 5 is referred to as "Model 2", and the electronic component 1B illustrated in FIG. 6 is referred to as "Model 3".

In the simulation, the same simulation was performed for configurations of Comparative Examples 1 and 2, to compare with Models 1 to 3.

Figure 7:
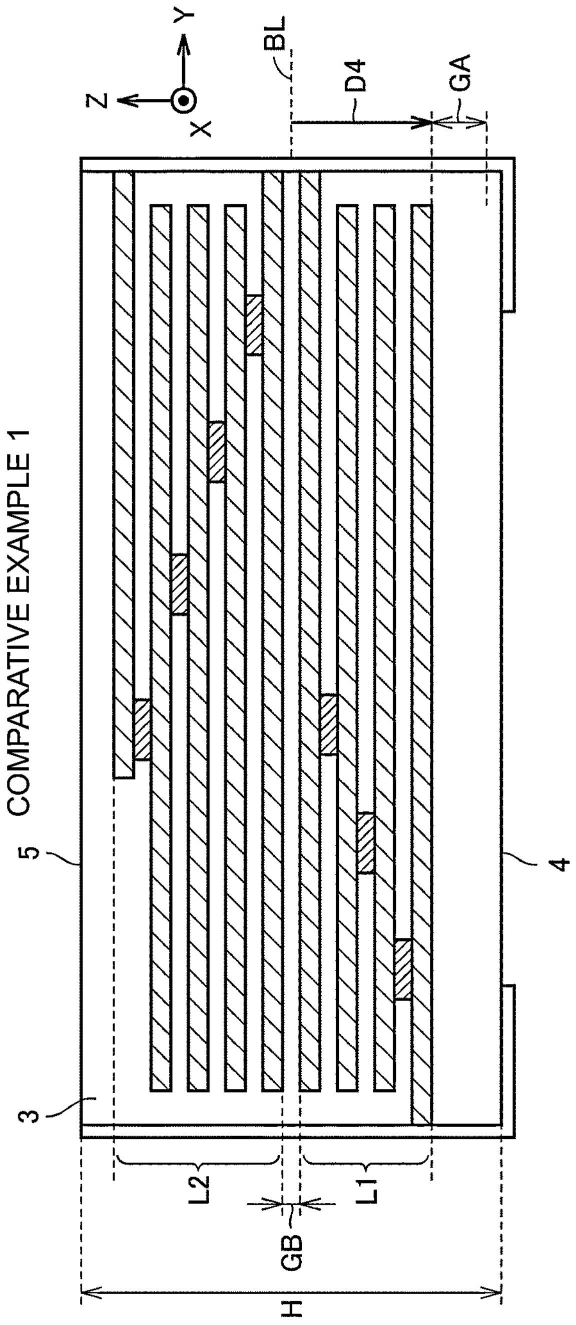
FIG. 7 is a diagram illustrating a configuration of Comparative Example 1.

FIG. 7 is a diagram illustrating a configuration of an electronic component according to Comparative Example 1. In the electronic component of Comparative Example 1, the gap GA is located in a region between the bottom surface 4 and the primary coil L1 while maintaining a height of the body 3 at the predetermined value H. That is, in Comparative Example 1, the gap GA is not provided in any of a region in the primary coil L1, a region in the secondary coil L2, and a region between the primary coil L1 and the secondary coil L2.

Figure 8:
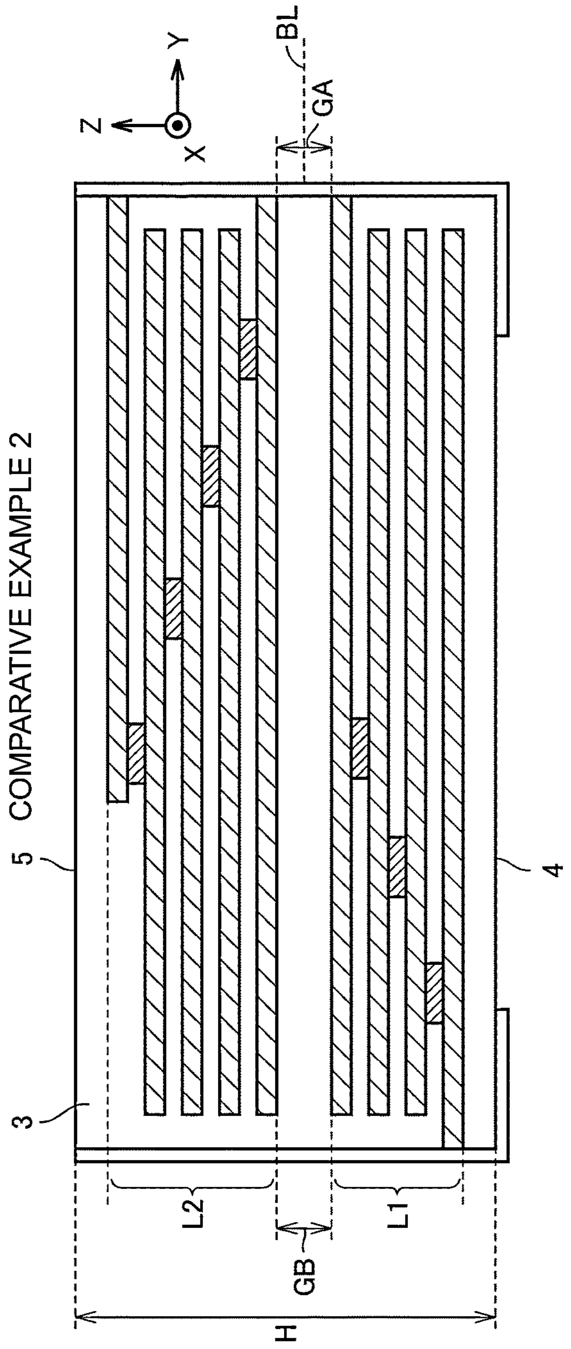
FIG. 8 is a diagram illustrating a configuration of Comparative Example 2.

FIG. 8 is a diagram illustrating a configuration of an electronic component according to Comparative Example 2. In the electronic component of Comparative Example 2, the gap GA is provided in a region between the primary coil L1 and the secondary coil L2 while a height of the body 3 is maintained at the predetermined value H.

Figures 9, 10:
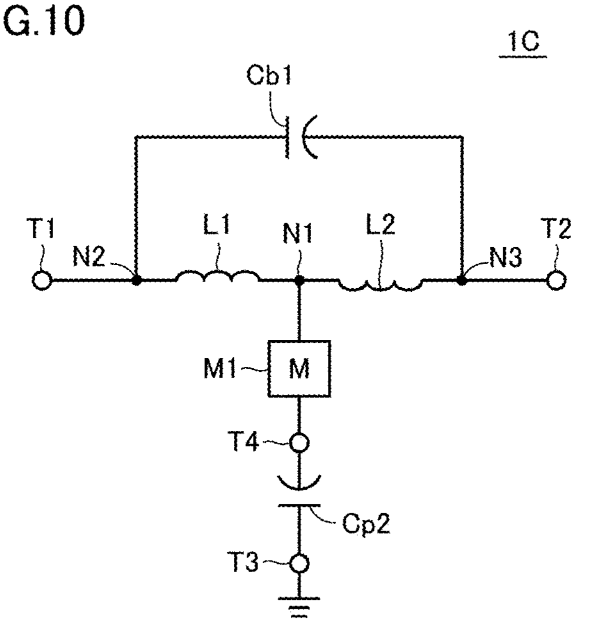
FIG. 9 is a diagram illustrating an example of a simulation result of a coupling coefficient.
FIG. 10 is a circuit diagram (part 2) of the electronic component.

FIG. 9 is a diagram illustrating an example of a simulation result of the coupling coefficient k. FIG. 9 illustrates an inductance value (unit: nH) of the primary coil L1, an inductance value (unit: nH) of the secondary coil L2, and the coupling coefficient k between the primary coil L1 and the secondary coil L2 obtained by a simulation for each of Models 1 to 3 and Comparative Examples 1 and 2.

The coupling coefficient k of Comparative Example 1 in which no gap GA is provided is "0.585". The coupling coefficient k of Comparative Example 2 in which the gap GA is provided between the coils is "0.460", and a significant decrease of approximately 21% is caused, with a reference of the coupling coefficient k of "0.585" of Comparative Example 1 in which no gap GA is provided.

On the other hand, the coupling coefficients k of Models 1 to 3 in which the gap GA is provided in the primary coil L1 are "0.500", "0.550", and "0.580", respectively, and the significant decrease as in Comparative Example 2 does not occur, with respect to Comparative Example 1. In addition, there is no significant difference in the inductance values of the coils L1 and L2 of each of Models 1 to 3 from Comparative Examples 1 and 2.

As can be seen from the simulation result, in Models 1 to 3 of the present application, as compared with Comparative Example 2 in which the gap GA is provided between the coils, the coupling coefficient k can be finely changed without largely changing the inductance values of the primary coil L1 and the secondary coil L2.

Further, if Model 2 and Model 3 are compared with Model 1 as a reference, each inductance value of the coils L1 and L2 of Model 2 and Model 3 is reduced to a decrease width of less than 3.6% from the reference. On the other hand, the coupling coefficient k of Model 2 has a increase width of approximately 9.1% from the reference. Meanwhile, the coupling coefficient k of Model 3 has a increase width of approximately 14.1% from the reference, which is significantly changed than Model 2.

As can be seen from this simulation result, it can be seen that the change in coupling coefficient k is larger than the change in inductance value of each coil L1 and L2 by changing the insertion position of the gap GA (distance in the Z-axis direction from the boundary BL to the gap GA) in the primary coil L1. In other words, the coupling coefficient k can be gradually changed without significantly changing the inductance value of each of the coils L1 and L2 by changing the insertion position of the gap GA in the primary coil L1.

In particular, in Model 3, since the gap GA is located at a position farthest from the boundary BL, the gap GA is not involved in the coupling between the primary coil L1 and the secondary coil L2. In other words, in Model 3, the coupling coefficient k can be more finely adjusted, as compared with Model 1 and Model 2.

As described above, in each of the electronic components 1, 1A, and 1B according to the present example embodiment, the gap GA is located in the primary coil L1, instead of between the primary coil L1 and the secondary coil L2. Therefore, the coupling coefficient k can be more finely adjusted than in a case where the gap GA is located between the primary coil L1 and the secondary coil L2. Further, since the gap GA is not located in the secondary coil L2, the height of the body 3 can be reduced, as compared with a case where the gap GA is located in both the primary coil L1 and the secondary coil L2. As a result, the coupling coefficient k can be finely adjusted while preventing an increase in height of the body 3.

Further, in the electronic components 1, 1A, and 1B, the insertion positions of the gaps GA are made different from each other in the primary coils L1. Therefore, the coupling coefficient k between the primary coil L1 and the secondary coil L2 can be gradually adjusted while maintaining the height of the body 3 at the predetermined value H.

Modification Example

In the present example embodiment, the example is described in which the shapes of the respective wiring patterns 11 to 19 are all loop shapes of less than one lap when viewed in the Z-axis direction, and the shapes of the respective wiring patterns 11 to 19 are not limited to this.

For example, the shapes of the wiring patterns 14 and 15 closest to the boundary BL may be in a loop shape (spiral shape) of one or more laps while the shapes of the wiring patterns 11 and 19 farthest from the boundary BL is maintained in a loop shape of less than one lap. By doing so, an inductance value of each of the primary coil L1 and the secondary coil L2 can be increased. The other wiring patterns 12, 13, and 16 to 18 may be changed to a spiral shape as necessary.

In addition, in the present example embodiment, the example is described in which the gap GA is formed by adding the insulating layer 3*d* in which no wiring pattern is formed to the primary coil L1, and the method of forming the gap GA is not limited to this.

For example, in FIG. 3, instead of adding the insulating layer 3*d* in which no wiring pattern is formed, a thickness of the insulating layer 3*e* in which the wiring pattern 14 is formed may be set to a thickness equivalent to the other two insulating layer sheets. In this manner, the gap GA can be formed.

In addition, in the present example embodiment, the example is described in which the gap GA is located in the primary coil L1, and a coil in which the gap GA is to be located need only be either the primary coil L1 or the secondary coil L2. That is, the gap GA may be located in the secondary coil L2 instead of the primary coil L1.

Example Embodiment 2

FIG. 10 is a circuit diagram of an electronic component 1C according to present Example Embodiment 2. The electronic component 1C is a filter in which capacitors Cp2 and Cb1 are added to the electronic component 1 described above.

The capacitor Cp2 is connected between the external terminal T4 and the external terminal T3. The external terminal T4 is connected to the connection point N1 between the primary coil L1 and the secondary coil L2, and the external terminal T3 is grounded. Therefore, the capacitor Cp2 is connected between the connection point N1 of the primary coil L1 and the secondary coil L2 and the ground.

The capacitor Cp2 has a parasitic inductance, and the parasitic inductance can be canceled by a mutual inductance M generated by the magnetic coupling between the primary coil L1 and the secondary coil L2. The mutual inductance M can be represented by the following Expression (1) by using the coupling coefficient k.

$$M = k \cdot \sqrt{(L1 \cdot L2)} \quad (1)$$

In Expression (1), "L1" is an inductance value of the primary coil L1, and "L2" is an inductance value of the secondary coil L2.

The capacitor Cb1 is connected in parallel to the primary coil L1 and the secondary coil L2. Specifically, the capacitor Cb1 is connected between the connection point N2 between the external terminal T1 and the primary coil L1, and the connection point N3 between the external terminal T2 and the secondary coil L2.

In general, in a case where a shape of each coil is changed to adjust inductance values (L values) of a primary coil and a secondary coil, resonance characteristics (Q values) or the coupling coefficient k is also changed at the same time. Therefore, in a case of designing a filter or the like using the mutual inductance M, such as the electronic component 1C, a method may be adopted in which a shape of each coil is first designed such that the desired L value and Q value are obtained, and then the coupling coefficient k is adjusted such that a desired mutual inductance value is obtained. In a case where such a design method is adopted, as described in Example Embodiment 1 described above, the gap GA is located in one coil instead of between the coils, so that the coupling coefficient k can be finely adjusted without changing the inductance value of each coil very much.

Figure 11:
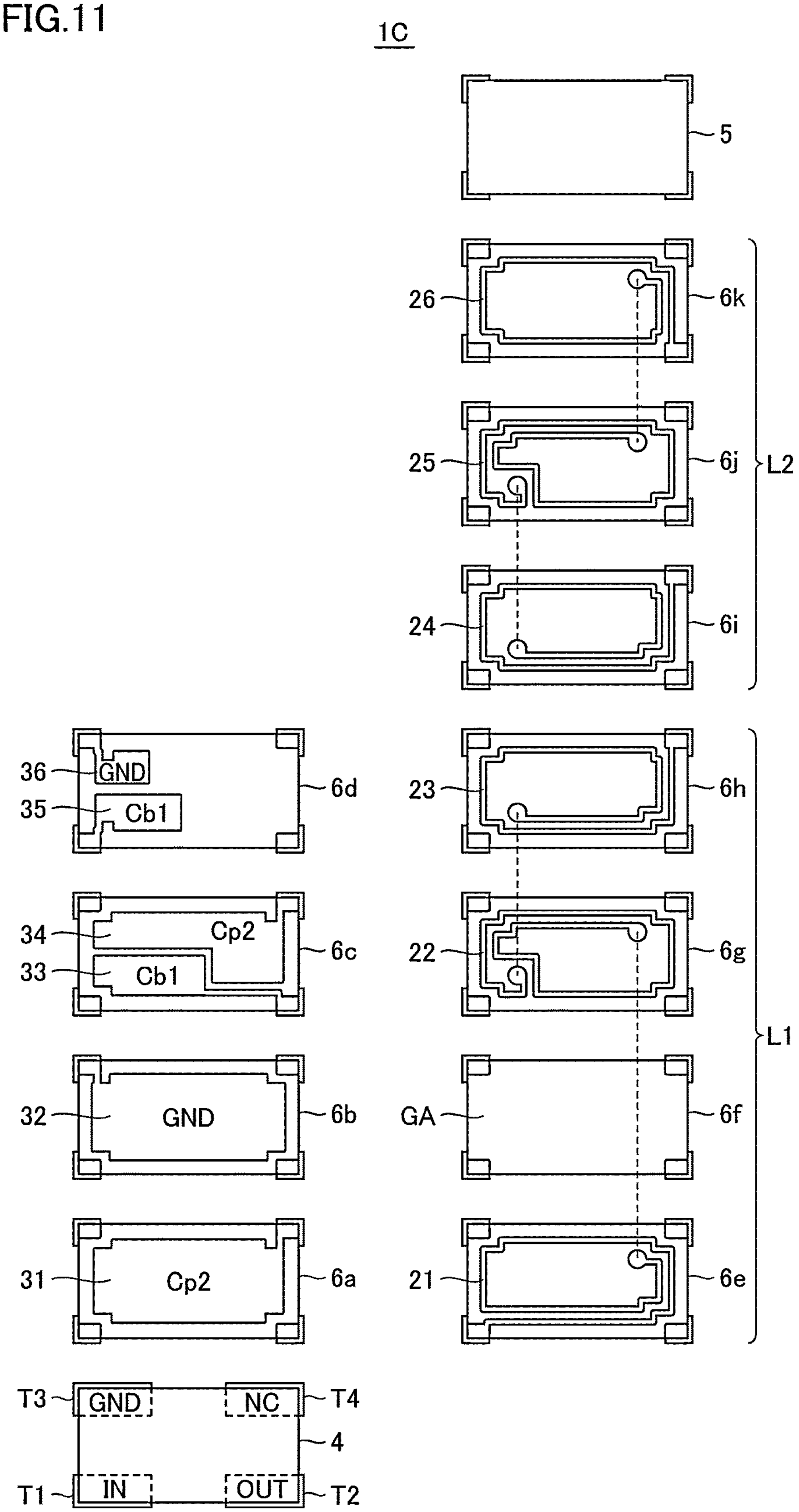
FIG. 11 is an exploded plan view (part 2) illustrating the internal configuration of the electronic component.

FIG. 11 is an exploded plan view illustrating an internal configuration of the electronic component 1C. In the electronic component 1C, insulating layers 6*a* to 6*k* of 11 layers (11 sheets) are laminated in this order in the Z-axis direction between the bottom surface 4 and the top surface 5.

The primary coil L1 in the electronic component 1C is formed by laminating the four insulating layers 6*e* to 6*h*. Each of three wiring patterns 21 to 23 is provided at each of upper surfaces of the insulating layers 6*e*, 6*g*, and 6*h*. No wiring pattern is provided at an upper surface of the insulating layer 6*f*. That is, the gap GA is located in the primary coil L1 by the insulating layer 6*f*.

The secondary coil L2 in the electronic component 1C is formed by laminating the three insulating layers 6*i* to 6*k*. Each of three wiring patterns 24 to 26 is provided at each of upper surfaces of the insulating layers 6*i* to 6*k*. The gap GA is not formed in the secondary coil L2.

All the wiring patterns 21 to 26 have a loop shape (spiral shape) of one or more laps.

Further, in a region between the primary coil L1 and the bottom surface 4, the insulating layers 6*a* to 6*c* to define the capacitors Cp2 and Cb1 are provided.

Each of the flat plate-shaped capacitance electrodes 31 and 34 is provided at an upper surface of each of the insulating layers 6*a* and 6*c*, and each of ground electrodes 32 and 36 in a flat plate shape is provided at an upper surface of each of the insulating layers 6*b* and 6*d*. The capacitance electrode 31, ground electrode 32, capacitance electrode 34, and ground electrode 36 are alternately laminated in order of the capacitance electrode and the ground electrode, whereby the capacitor Cp2 is provided.

A capacitance electrode 33 is provided at the upper surface of the insulating layer 6*c* separately from the capacitance electrode 34, and a capacitance electrode 35 is provided at the upper surface of the insulating layer 6*d* separately from the ground electrode 36. The capacitor Cb1 is formed by laminating the capacitance electrode 33 and the capacitance electrode 35.

As described above, in the electronic component 1C (filter) according to present Example Embodiment 2, the coupling coefficient k can be finely adjusted by providing the gap GA in the primary coil L1, so that a circuit constant as a filter can be finely adjusted. As a result, the degree of freedom in designing the filter characteristics can be improved.

In Example Embodiments 1 and 2 described above, the example is illustrated in which one end of the primary coil L1 and one end of the secondary coil L2 are connected to each other by the external terminal (outer electrode). Meanwhile, the primary coil L1 and the secondary coil L2 may be a four-terminal transformer-coil using, for example, a non-connect terminal (NC), without being electrically connected to each other. A connection portion between the wiring pattern and the external terminal may be defined as a coil end portion, and a coil group in which the coil end portion and the coil end portion are connected to each other may be defined as a primary coil L1 and a secondary coil L2, respectively.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:

a body with an insulating property and including a plurality of insulating layers; and a first coil and a second coil inside the body with an interval between the first coil and the second coil in a lamination direction in which the insulating layers are laminated, and connected in series to each other; wherein the first coil includes a plurality of first wiring patterns separated by intervals in the lamination direction;

the second coil includes:

a plurality of second wiring patterns separated by intervals in the lamination direction; and a gap in at least one region of a plurality of regions which are sandwiched between the second wiring patterns adjacent to each other in the lamination direction among the plurality of second wiring patterns; and a dimension of the gap is larger than a distance between the second wiring patterns adjacent to each other in the lamination direction without the gap and is different from a distance between the first wiring patterns adjacent to each other.

2. The electronic component according to claim 1, wherein the dimension of the gap is larger than the distance between the first wiring patterns adjacent to each other.

3. The electronic component according to claim 1, wherein the dimension of the gap is larger than a distance between the first wiring pattern of the first coil and the second wiring pattern of the second coil, which are adjacent to each other.

4. The electronic component according to claim 1, wherein a winding axis of the first coil is included in an opening of the second coil when viewed from the lamination direction, and a winding axis of the second coil is included in an opening of the first coil when viewed from the lamination direction.

5. The electronic component according to claim 1, wherein each of the plurality of first wiring patterns and the plurality of second wiring patterns is has a loop shape of less than one lap when viewed from the lamination direction.

6. The electronic component according to claim 1, wherein the first wiring pattern and the second wiring pattern closest to an adjacent portion of the first coil and the second coil have a loop shape of one or more laps when viewed from the lamination direction; and the first wiring pattern and the second wiring pattern farthest from the adjacent portion in the lamination direction have a loop shape of less than one lap when viewed from the lamination direction.

7. The electronic component according to claim 1, wherein the gap is in the second coil and adjacent to the second wiring pattern farthest from the first coil in the lamination direction.

8. The electronic component according to claim 1, further comprising:

a first external terminal, a second external terminal, and a third external terminal on the body; wherein one end of the first coil is electrically connected to the first external terminal;

one end of the second coil is electrically connected to the second external terminal; and another end of the first coil and another end of the second coil are electrically connected to the third external terminal.

9. The electronic component according to claim 1, wherein the body includes a rectangular or substantially rectangular bottom surface and a rectangular or substantially rectangular top surface that face each other, and four side surfaces that connect the bottom surface and the top surface;

the electronic component further comprises:

four external terminals that are respectively located at one of four corners of the body when viewed in the lamination direction; and each of the four external terminals extends along a bottom surface and two side surfaces that are in contact with a corner at which each of the four external terminals is located.

10. The electronic component according to claim 1, further comprising:

a first capacitor that is connected to a connection point between the first coil and the second coil; and a second capacitor that is connected in parallel to the first coil and the second coil.

11. The electronic component according to claim 1, wherein the electronic component is a transformer.

12. The electronic component according to claim 1, wherein the first coil and the second coil are magnetically coupled to each other.

13. The electronic component according to claim 1, wherein the first coil and second coil are differentially connected to each other.

14. The electronic component according to claim 1, wherein the first coil and the second coil are connected to each other in a movable manner.

15. The electronic component according to claim 1, wherein the gap is located in the first coil.

16. The electronic component according to claim 1, wherein the gap is located in the second coil.

17. The electronic component according to claim 10, wherein the second capacitor has a parasitic inductance that is canceled by a mutual inductance between the first coil and the second coil.

18. The electronic component according to claim 1, wherein the first coil and the second coil are a four-terminal-transformer coil including a non-connect terminal such that the first coil and the second coil are not electrically connected to each other.

19. The electronic component according to claim 1, wherein the first coil and the second coil are connected to each other by an external coil.

* * * * *